United States Patent [19]
Renton

[11] Patent Number: 5,233,642
[45] Date of Patent: Aug. 3, 1993

[54] CELLULAR TELEPHONE USAGE MONITORING SYSTEM

[75] Inventor: Paul Renton, Seattle, Wash.
[73] Assignee: Omnitronix, Inc., Seattle, Wash.
[21] Appl. No.: 750,320
[22] Filed: Aug. 27, 1991

Related U.S. Application Data

[63] Continuation-in-part of Ser. No. 705,109, May 24, 1991, abandoned.

[51] Int. Cl.⁵ ............................................ H04M 11/00
[52] U.S. Cl. ...................................... 379/59; 379/91; 379/111; 379/112
[58] Field of Search ..................... 379/58, 59, 63, 91, 379/132, 143, 144, 155, 357, 111–115; 364/406; 358/84; 355/202; 365/96

[56] References Cited

U.S. PATENT DOCUMENTS

| | | | |
|---|---|---|---|
| 4,907,273 | 3/1990 | Wiedemer | 380/16 |
| 4,922,517 | 5/1990 | West, Jr. et al. | 379/58 |
| 4,951,308 | 8/1990 | Bishop et al. | 379/91 |
| 4,959,851 | 9/1990 | Tobolski, Jr. et al. | 379/59 |
| 4,975,942 | 12/1990 | Zebryk | 379/144 |

Primary Examiner—Curtis Kuntz
Assistant Examiner—Dwayne D. Bost
Attorney, Agent, or Firm—Seed and Berry

[57] ABSTRACT

A mobile unit generates and collects call detail record information relating to the usage of a mobile cellular telephone system which is compatible with conventional telephone devices. A communications interface transfers the call detail record information to a stationary unit containing a computer and an evaluation program. The computer and its evaluation program evaluate the usage of the mobile cellular telephone system. The invention may be used to provide billings for rental use of a cellular telephone, to verify cellular telephone billings, and in other applications requiring monitoring of the usage of a cellular telephone system. The evaluation program used to evaluate the call detail record information is independent of the microprocessor and program used for the call detail record information generation and collection. The evaluation program may be very complex so as to tailor the evaluation of the call detail record information to the exact needs of an application. The independence of the evaluation program from the call detail record information generation and collection functions allows the system to be highly flexible, while not requiring any modifications to the invention in order to make changes to the evaluation of the call detail record information.

27 Claims, 10 Drawing Sheets

CELLULAR TELEPHONE USAGE MONITORING SYSTEM

This application is a continuation-in-part of U.S. patent application Ser. No. 07/705,109 filed on May 24, 1991 now abandoned.

BACKGROUND OF THE INVENTION

Many telephone systems have a computer data port which is used to provide information relating to the usage of the telephone system. Most PBXs or key telephone systems have an RS-232 serial port through which are output records of the details of each telephone call which occurred on the telephone system. These call detail records may be collected in a computer system and evaluated to determine telephone usage, make price estimations for telephone usage, provide a means to independently verify a telephone billing, and provide reports of telephone usage so as to enable better management of the telephone system, and many other uses.

A mobile cellular telephone does not have a computer data port from which such call detail records can be collected. The cellular telephone company can provide, on a monthly basis, a detailed accounting of the telephone usage. However, the user of the mobile cellular telephone is not able to independently verify the usage of the cellular telephone or perform other analysis of the usage of the cellular telephone as can be done with conventional PBX and key telephone systems.

When a rental car is equipped with a cellular telephone, cellular telephone usage may need to be determined in order for the rental agency to accurately bill the rental customer for the usage of the cellular telephone. It is inconvenient and impractical for the rental agency to wait for the end of the month to receive the cellular telephone usage report from the cellular telephone company, and then from that report charge the rental customer for the usage of the cellular telephone. The cellular telephone usage must be able to be known quickly and accurately so that the rental agency can correctly charge the rental customer for the usage of the cellular telephone. If a cellular telephone by itself is rented, then usage of the cellular telephone may also need to be monitored so that proper rental rates can be calculated by the rental aqency.

Cellular telephones exist which have an adaptor which converts the cellular telephone handset output from the cellular transceiver into a simulated telephone line which is compatible with common public switched telephone network compatible equipment. Although this adaptor allows commonly available telephone equipment to be connected to the cellular telephone, it does not provide a computer data port which generates call detail records so that the usage of the cellular telephone can be monitored. A practical means of monitoring the usage of a mobile cellular telephone and providing information relating to the usage of the cellular telephone is needed.

Since a cellular telephone has airtime charges which are incurred whenever the telephone is used, both for outbound and incoming calls, the usage of the cellular telephone for both incoming and outbound calls must be monitored. A system to monitor cellular telephone usage must record the date and time of the start of any telephone call, either incoming to the cellular telephone or outbound from the cellular telephone, the duration of the telephone call, an indication that a particular call was incoming or outbound, and any digits which were dialed to place an outbound cellular telephone call. This information is needed in order to accurately monitor cellular telephone usage. In the case of a telephone which is rented and for which a billing must be created based upon usage of the cellular telephone, the bill for the rental customer can be calculated based upon this information. This information must also be known if a printout or computer record which provides a record of the cellular telephone usage is to be created.

A practical means of monitoring cellular telephone usage is needed in order to provide a means by which the usage of the cellular telephone can quickly and easily be determined, so that evaluation or billing based upon the usage of the cellular telephone can practically be accomplished.

SUMMARY OF THE INVENTION

It is an object of the invention to provide a means to interface to a cellular telephone which has a simulated telephone line adaptor and monitor the usage of the cellular telephone.

It is a further object of the invention to provide a means to generate and collect call detail records based upon the usage of the cellular telephone, where such records contain the date and time of the start of any cellular telephone call, an indication of an incoming or an outbound telephone call, information relating to the dialed digits used to place an outbound telephone call, and information relating to the duration of the cellular telephone call.

It is a still further object of the invention to provide a means to transfer the call detail records to a computer system for evaluation of the cellular telephone usage.

As shown in the detailed description of the invention, the present invention provides a means to interface to a simulated telephone line from an adaptor connected to the cellular telephone, provides a means to generate and collect call detail records indicative of the usage of the cellular telephone, and also provides a means to transfer the call detail records to a computer for evaluation of the cellular telephone usage. The invention provides these function in a practical manner which allows quick, accurate evaluation of the usage of the cellular telephone, and also provides these means in such a fashion that the evaluation of the cellular telephone usage can be performed in a manner which is tailored to the needs of the user of the invention.

Briefly, the invention consists of interface circuitry and a microprocessor with a memory which generates and stores in the memory of the microprocessor call detail records relating to the usage of the cellular telephone. The invention is constructed such that the interface circuitry, the microprocessor, and the memory are connected to the mobile cellular telephone for the generation and collection of the call detail records, providing a mobile unit. A removable memory device, which can be a static RAM, a magnetic disk, or other removable memory device is used. The removable memory device is removed and then used with a stationary unit which includes a computer which reads information from the memory device, thereby transferring the call detail records to a computer for evaluation. In the detailed description of the invention the removable section of the device which includes the microprocessor memory also includes the microprocessor and the interface circuitry. However, the invention could also be constructed to use a removable section of the device in which the microprocessor memory only is removed, leaving the interface circuitry and the microprocessor connected to the cellular telephone, as when a magnetic disk is used as the memory device.

Alternative embodiments of the invention are also disclosed in which the call detail record information is transferred to a computer via a cable, a modem, and a radio link. Each of these embodiments comprises a mobile unit which generates and collects the call record detail information, a communications interface for transferring the call record detail information, and a stationary unit which is used to evaluate the call record detail information.

DETAILED DESCRIPTION OF THE INVENTION

The invention comprises a mobile unit which generates and collects call detail record information relating to the usage of a cellular transceiver, a stationary unit which evaluates the call detail record information, and a communications interface which transfers the call detail record information from the mobile unit to the stationary unit. The communications interface may be a cable, a radio link, a data modem for transferring data via the cellular transceiver, or a serial communications link which transfers the call detail record information to the stationary unit from a memory which is removable from the mobile unit. Other communications interfaces which may be used with removable memories are also described, including interfaces which utilize input/output ports or a disc drive to transfer the call detail record information from a removable memory to the stationary unit.

Figure 1:
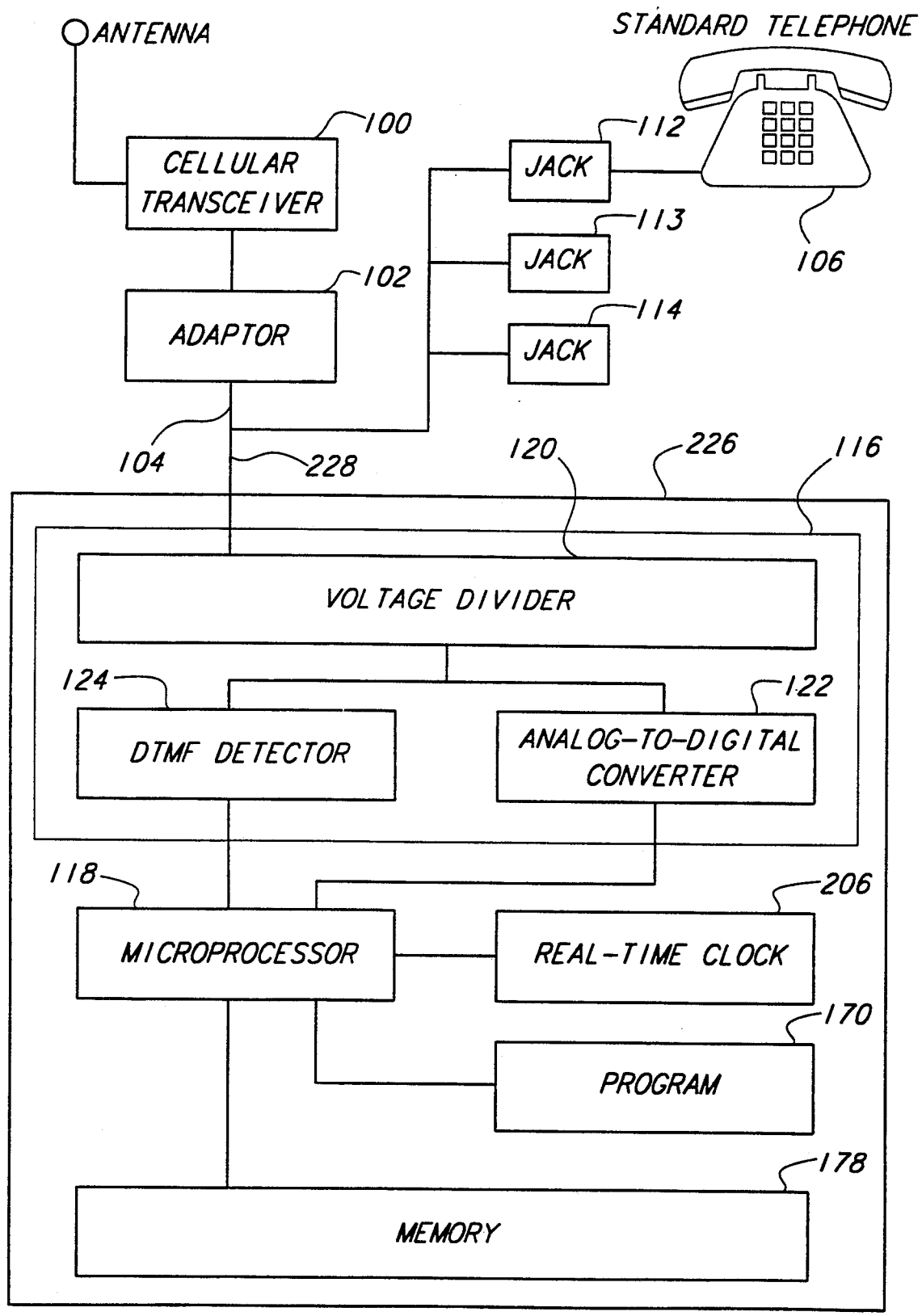
FIG. 1 shows a cellular telephone system used with the invention.

As shown in FIG. 1, the cellular transceiver 100 is provided with an adaptor 102 which provides a simulated telephone line 104 compatible with a standard telephone device 106 which would ordinarily connect to a telephone line connected to the public switched telephone network. Such adaptor 102 may be a "Cel-Jack" from Telular Inc, Wilmette, Ill., or other such adaptor. Alternatively, the cellular transceiver 100 may be equipped with such an adaptor manufactured as a part of the cellular transceiver, as described in U.S. Pat. No. 4,959,851 by Francis Tobolski, Jr. et al.

The simulated telephone line 104 may be connected to a standard telephone 106, a public switched telephone network compatible modem, a facsimile machine, or a cordless telephone. The adaptor 102 may provide, in addition to the ringing voltage and a standard DC telephone loop, dial tone signals and other audio signals which are usually employed when the public switched telephone system is used. Telephones, modems, and facsimile machines which are capable of connection to the public switched telephone system can be used with a cellular telephone when such an adaptor 102 is used with the cellular transceiver 1 The simulated telephone line 104 tip 108 and ring 110 signal lines (see FIG. 3) carry the audio, the ringing .voltage, and the DC loop current as found on a public switched telephone network telephone line.

The tip 108 and ring 110 signal lines of the simulated telephone line 104 are connected to one or more RJ-11C jacks 112-114 which provide the connections between the adaptor 102 and the telephone devices which the user of the cellular system wishes to have connected to the cellular transceiver. Additionally, the tip and ring signals of the simulated telephone line 104 from the adaptor 102 are connected, by cable 228, to interface circuitry 116. The microprocessor 118, through the use of the interface circuitry 116, monitors the tip 108 and ring 110 signal lines so as to detect on-hook and off-hook conditions of the telephone devices connected to the simulated telephone line 104, monitors the tip 108 and ring 110 signals so as to detect the ring voltage provided on the simulated telephone line 104 by the adaptor 102, and monitors the tip 108 and ring 110 signal lines to detect any dialed digits from any of the telephone devices connected to the simulated telephone line 104, in the following manner.

Figure 3:
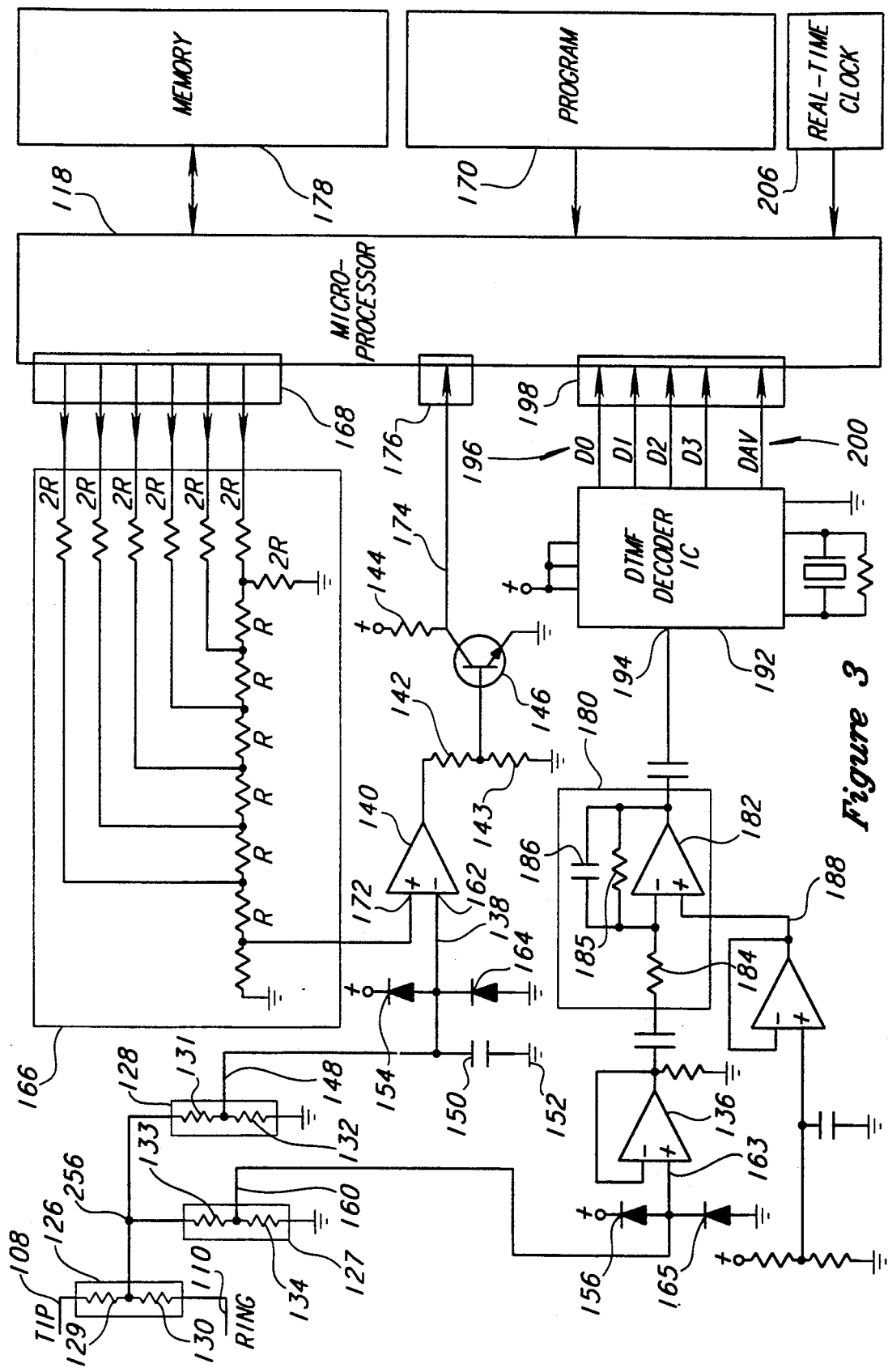
FIG. 3 is a schematic diagram of the call record generation and storage module.

The interface circuitry 116 consists of a voltage divider 120, an analog-to-digital converter 122, and a dual-tone multi-frequency (DTMF) detector 124. The voltage divider 120 is used to connect the interface circuitry 116 to the tip 108 and ring 110 signal lines. When all of the telephone devices connected to the simulated telephone 104 are on-hook, there will typically be a DC voltage of about 10 to about 48 volts between the tip 108 and ring 110 signal lines. The value of the on-hook voltage will vary with the particular adaptor 102 used and the number of devices connected to the simulated telephone line 104. As shown in FIG. 3, the first section 126 of the voltage divider 120 is connected so that the positive tip signal on the tip 108 signal line is at one end of the first section 126 of the voltage divider 120, and the negative ring signal on the ring 110 signal line is connected to the other end of the first section 126 of the voltage divider 120. On occasion, the polarity of the simulated telephone line 104 signals may be reversed. If the polarity of the simulated 104 telephone line signals is unknown, then a full-wave bridge (not shown) may be used between the tip 108 and ring 110 signal lines, and the positive and negative outputs of the bridge used in the place of the tip and ring signals, in the manner well practised in the field.

The first section 126 of the voltage divider 120 divides the voltage present between the tip 108 and ring 110 signal lines. When the voltage on the simulated telephone line 104 varies, the voltage present at the output of the first section 126 of the voltage divider 120 will vary with the voltage present on the simulated telephone line 104. The voltage-divider 120 consists of 6 resistors 129–134 in three sections 126–128 arranged as shown in FIG. 3. The first two resistors 129 and 130, connected between the tip 108 and ring 110 signal lines, divide the voltage between the tip and ring signals. The large values of these resistors 129 and 130 provide a large resistance to current flow across the tip 108 and ring 110 signal lines of the simulated telephone line 104, so that the simulated telephone line 104 is not brought into an off-hook condition by the connection of the interface circuitry 116 to the simulated telephone line 104. The remaining four resistors 131–134 are all of equal value. The second section 127 and the third section 128 of the voltage divider 120 each divide the voltage output 256 from the first section 126 of the voltage divider 120 by two. Two sections are used so that the loading of the output of each section does not affect the output of the other section.

The junction point 160 of the two resistors 133 and 134 is buffered by one op amp stage 136 of a quad op amp. The op amp used is an LM324, commonly available from a number of manufacturers. The junction point 148 of the two resistors 131 and 132 is connected to the first input 138 of a comparator 140 consisting of another stage of the quad op amp, three resistors 142–144 and a transistor 146. The resistor divider junction point 148 which is connected to the first input 138 of the comparator 140 has a capacitor 150 connected between the junction point 148 and the circuit ground 152 so as to provide a single-pole low-pass filter. This low-pass filter removes the audio from the signal provided to the comparator 140, and further serves to smooth out slight fluctuations in the DC voltage provided to the comparator 140. If this capacitor 150 is too small, the audio signal is applied to the comparator 140 which may result in false detection of a return to the on-hook condition during a phone call. If this capacitor 150 is too large, then the response time of the comparator 140 is too slow, and short on-hook or off-hook conditions may not be recognized, or the capacitor 150 may suppress the ringing voltage presented to the comparator first input 138 so as to not allow it to swing very far when the ringing signal is applied. The capacitor 150 presently used is a 0.01 microfarad capacitor, used with 470K resistors for the resistor divider resistors 131 and 132.

Each of the junction points 148 and 160 of the second 127 and third 128 resistor divider sections has a diode 154 and 156, respectively, connected with its anode at the junction points as is 160 and its cathode at the positive supply 158. This ensures that the voltage present at the voltage divider junction points 148 and 160 will never exceed the positive supply voltage by more than the voltage drop across the diode 154 or 156. In this fashion the op amp inputs 162 and 163, of the comparator 140 and the op amp 136, respectively, are protected from any potential positive voltage levels that would exceed the positive supply 158 by more than 0.6 volts. The op-amp inputs 162 and 163 are also each protected from large negative voltage levels by a separate diode 164 and 165, respectively, connected with its cathode on the junction point 148 or 160 and its anode connected to the circuit ground 152. A negative voltage present at the resistor divider junction points 148 or 160 would cause current to flow through the diodes 164 and 165 connected to the ground 152 as these diodes 164 and 165 would now be forward-biased. The tip 108 signal line of the simulated telephone line 104 may be passed through a diode of type 1N4001 (not shown) before it is presented to the voltage divider 120 so that an improper connection of the interface circuitry 116 to the simulated telephone line 104 will result in no significant current flow through the voltage divider 120 since such a diode would be reverse-biased.

The analog-to-digital converter 122 consists of a R-2R resistor ladder 166 (see FIG. 3) connected to port pins 168 controlled by the microprocessor 118, and the comparator 140. The microprocessor 118, under control of its program 170, provides a series of digital values to be presented on the port pins 168 connected to the R-2R resistor ladder 166. This provides a simple digital-to-analog function in the fashion well known to those skilled in the art. The analog voltage generated by this simple digital-to-analog converter is presented to the second input 172 of the comparator 140. The comparator output 174 will be in one state when the analog voltage presented to the second input 172 of the comparator 140, developed by the simple digital-to-analog converter, is greater than the voltage provided to the first input 138 of the comparator 140, which is connected to the third section 128 of the voltage divider 120. When the voltage at the first input 138 of the comparator 140 is greater than the voltage provided to the second input 172 of the comparator 140, then the comparator output 174 will change state.

Under control of its program 170, the microprocessor 118 presents a series of digital values to the R2R resistor ladder 166 which are used to generate a ramp voltage at the second input 172 of the comparator 140. To generate the ramp voltage at the comparator input 172, the value output to the simple digital-to-analog converter on the port pins 168 starts at a hexidecimal value of 00H, and is incremented by one until the microprocessor program 170 stops the ramp voltage generation or the value reaches a hexidecimal value of 3FH. The comparator output 174 is monitored by the microprocessor 118. When the comparator output 174 changes state such as to indicate that the voltage at the second input 172 of the comparator 140 is greater than the voltage at the first input 138 of the comparator 140, then the microprocessor program 170 stores in the memory 178 of the microprocessor 118 the digital value which is presently provided on the port pins 168 to the R-2R resistor ladder 166, and stops generation of the ramp voltage. In this fashion the analog-to-digital converter function of the invention is provided. The microprocessor 118 is thereby capable of monitoring the voltage level of the simulated telephone lines 104. It should be noted that alternatively a single integrated circuit analog-to-digital converter (not shown) could be used in the invention. A single integrated circuit analog-to-digital converter was not used since the interface circuitry 116 could be constructed with a minimum of integrated circuits through the use of a single IC package which contained a quad op amp.

The voltage divider junction point 160 from the second section 127 of the voltage divider 120 is buffered by one stage of the quad op-amp 136 and is capacitively coupled to a low-pass filter 180 comprising the third stage op amp 182 of the quad op amp, two resistors 184 and 185, and a Capacitor 186 in a circuit well known and understood by a person skilled in the art. This low-pass filter 180 uses a reference voltage 188 developed at one-half of the power supply voltage of the quad op-amp. The output from the low-pass filter 180 is capacitively coupled to a DTMF decoder IC 192. This low-pass filter 180 is used to prevent high-frequency signals from being coupled to the input 194 of the DTMF decoder IC 192. The DTMF decoder IC 192 is a CS204 manufactured by Crystal Semiconductor. The DTMF decoder IC 192 translates dual-tone-multi-frequency tones into a four-bit binary signal 196 which is coupled to the microprocessor 118 by input port 198. The DTMF decoder IC 192 also provides a data available (DAV) signal line 200 which is coupled to the microprocessor 118 by input port 198.

Detection of the on-hook and off-hook conditions of the simulated telephone line 104 is accomplished by monitoring the voltage level of the simulated telephone line 104 in the fashion described above. When all telephone devices that are connected to the simulated telephone line 104 are on-hook, or when no telephone devices are connected to the simulated telephone line 104, the DC voltage of the simulated telephone line 104 is in the range of about 10 to about 48 volts. When any of the telephone devices goes off-hook the DC voltage of the simulated telephone line 104 drops, usually to a voltage level of around 5 volts. The microprocessor 118, under control of its program 170, is continually monitoring the voltage present on the simulated telephone line 104 through the analog-to-digital converter 122. The program 170 detects the drop in the simulated telephone line voltage and uses the detection of the drop in the simulated telephone line voltage to determine when one of the telephone devices connected to the simulated telephone line 104 has gone off-hook. The program 170 also detects a rise in the simulated telephone line voltage and uses the detection of the rise in the simulated telephone line voltage to determine when one of the telephone devices connected to the simulated telephone line 104 has gone on-hook. Transitions which last for more than one-half second from the on-hook to off-hook state, or from the off-hook to on-hook state are considered valid transitions. The one-half second time period ensures that noise on the simulated telephone line 104 does not produce false on-hook and off-hook transitions.

The on-hook voltage of the simulated telephone line 104 is determined by reading the voltage on the simulated phone line 104 for one second and averaging the voltage level. This function is performed by the microprocessor 118 whenever the microprocessor is reset, as when the microprocessor first starts to run. The average voltage level is stored in the memory 178 of the microprocessor 118 as the nominal on-hook voltage for the simulated telephone line 104. If the voltage level on the simulated telephone line 104 is less than 8 volts when the microprocessor 118 is attempting to determine the nominal on-hook voltage level, then the microprocessor 118 waits until the voltage level has exceeded 8 volts, and then waits another one-half second before beginning the operation of averaging the samples of the voltage level on the simulated telephone line 104. This avoids the microprocessor 118 determining the nominal on-hook voltage while any telephone device is off-hook, which would provide an incorrect nominal on-hook voltage.

The ringing voltage on the simulated telephone line 104 is detected in a similar manner to the on-hook and off-hook conditions. The ringing voltage is an AC voltage which is superimposed upon the DC voltage present on the simulated telephone line 104. This ringing voltage is usually in the range of 40 to 100 volts, with a frequency of from 20 to 40 hertz. The monitoring of the voltage on the simulated telephone line 104 by the microprocessor 118 allows the microprocessor 118 to detect the ringing voltage. This is accomplished by monitoring the simulated telephone line 104 voltage for transitions of the voltage above and below the on-hook voltage level. When a transition both above and below the on-hook voltage level is detected, the microprocessor 118 determines that a ringing signal is being applied to the simulated telephone line 104.

The microprocessor 118 looks for transitions of the simulated telephone line 104 voltage which exceed a few volts above and below the nominal on-hook voltage in order to detect a ring. This is accomplished by requiring the simulated telephone line 104 voltage to exceed the voltage of the nominal on-hook voltage plus a few volts in order for a transition above the on-hook voltage to be detected. The voltage of the nominal on-hook voltage minus a few volts is used as the lower threshold. These thresholds can be set by variables stored in the memory 178 of the microprocessor 118. By comparing the voltages read by the analog-to-digital converter 122 to the threshold values stored in memory 178, the microprocessor 118 can determine if the voltage on the simulated telephone line 104 is above or below each of the ring-detect thresholds. By changing the value of the threshold variables different detection schemes can be employed so as to require a larger or smaller level of the ringing signal in order for a ring to be recognized.

The ringing signal on the simulated telephone line 104 is typically applied for 2 seconds, with a 4 second time period between applications of the ringing voltage. The gaps between the rings of the telephone line can be detected by the microprocessor 118 by observation of the lack of transitions of the simulated telephone line 104 above and below the ringing voltage threshold levels for a given time period. This is used to detect the number of rings which occurred before a telephone device 106 is taken off-hook in response to an incoming telephone call.

The ringing voltage that is applied may be superimposed upon an on-hook DC voltage which is larger than the usual on-hook DC voltage of the simulated telephone line 104. In this case the monitoring of the simulated telephone line 104 voltage can still detect the ringing signal, as the ringing voltage will cause the simulated telephone line 104 voltage to rise above and fall below the nominal on-hook voltage due to the large voltage of the ringing signal.

The microprocessor 118 may also monitor the simulated telephone line 104 for a condition in which the voltage on the simulated telephone line drops below a predetermined threshold, in order to determine that the cellular transceiver 100 has been turned off. The simulated telephone line 104 may be monitored, through the analog-to-digital converter 122, for a reading of below 1 volt. The microprocessor 118, may then terminate the monitoring of the off-hook condition as it has been determined that the cellular transceiver has been turned off. Such monitoring prevents the condition of the cellular transceiver being turned off as being detected as an off-hook condition.

The signals from the DTMF decoder IC 192 are presented to input port 198 of the microprocessor 118. The microprocessor 118 collects any dialed digits based upon the state of the four-bit signal 196 which corresponds to the binary value of the dialed digit, and upon the DAV signal 200 supplied by the DTMF decoder IC 192. When the microprocessor 118 detects a rising edge of the DAV signal 200, the microprocessor 118 reads the four-bit binary value presented by the DTMF decoder IC 192. The dialed digit information is stored in the memory 178 of the microprocessor 118, so that the dialed digit information can be used to create a call detail record.

Figure 8:
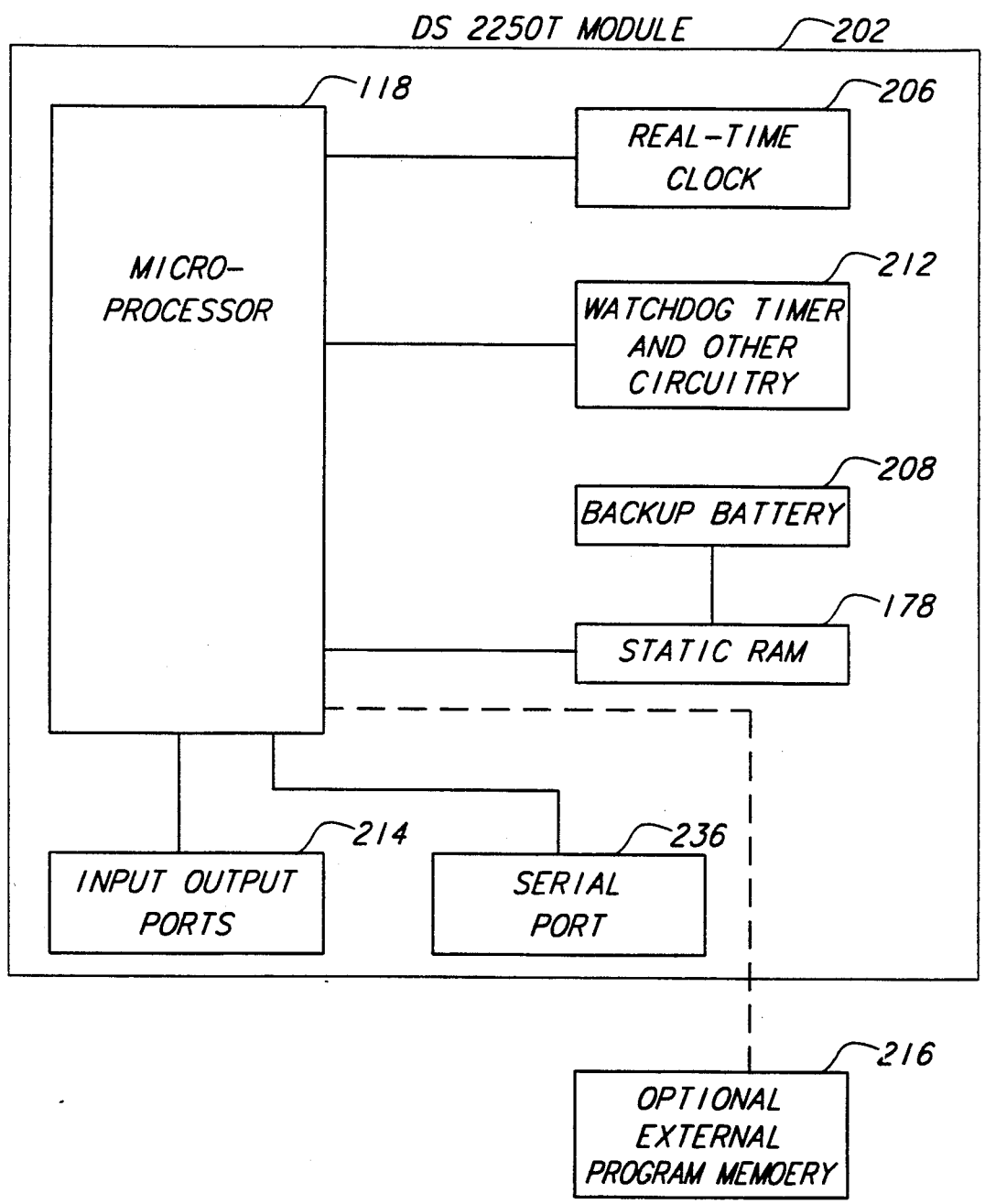
FIG. 8 provides a block diagram of the DS2250T microcontroller module.

As shown in FIG. 8, the microprocessor 118 used is contained in a DS2250T module 202 manufactured by Dallas Semiconductor. The DS2250T module 202 is a microcontroller module which contains an 8031-compatible microprocessor comprising microprocessor 118, a real-time clock 206, a backup battery 208, 8K of static RAM comprising memory 178, and a watchdog timer and other circuitry 212 to provide a battery-backed memory of program and data. Port pins 214 are available for inputs and outputs in the fashion well understood to one skilled in the art.

The real-time clock 206 of the DS2250T module 202 allows the microprocessor 118 to accurately determine the date and time at which a telephone call was initiated. This is done by reading the real-time clock 206 at the point in time when a transition from an on-hook to an off-hook condition of the simulated telephone line 104 is detected. The date and time information which is read from the real-time clock 206 at this point in time is stored in the memory 178 of the microprocessor 118.

The battery-backed RAM memory 178 provides the memory for the microprocessor 118. The battery-backed RAM memory 178 is also used to store the program 170 for the microprocessor 118, although the microprocessor program 170 could be stored outside the DS2250T module 202 in an optional separate memory 216.

The microprocessor 118, under control of its program 170, uses the analog-to-digital converter 122 to analyze the state of the simulated phone line 104, and also detects any dialed digits from the signals 196 and 200 provided by the DTMF detector IC 192, and generates and stores in its memory 178 call detail records which contain information relating to the date and time at which a call was placed or an incoming call was received, any digits dialed when an outbound call was placed, and other desired information. These records are stored in the memory 178 of the microprocessor 118 so that they can be retrieved at an appropriate time and analyzed to provide information concerning the use of the cellular transceiver 100.

The monitoring of the simulated telephone line 104 is performed by a timer interrupt set to interrupt the microprocessor 118 about 300 times a second. The interrupt routine in response to this timer interrupt reads the voltage on the simulated telephone line 104 through the use of the analog-to-digital converter 122 and determines if the simulated telephone line 104 is in an on-hook, off-hook, or ringing condition. The interrupt routine updates variables stored in the microprocessor memory 178 indicative of the status of the simulated telephone line 104, so that the microprocessor program 170 can branch based on these variables which reflect the status of the simulated telephone line 104.

Figure 4:
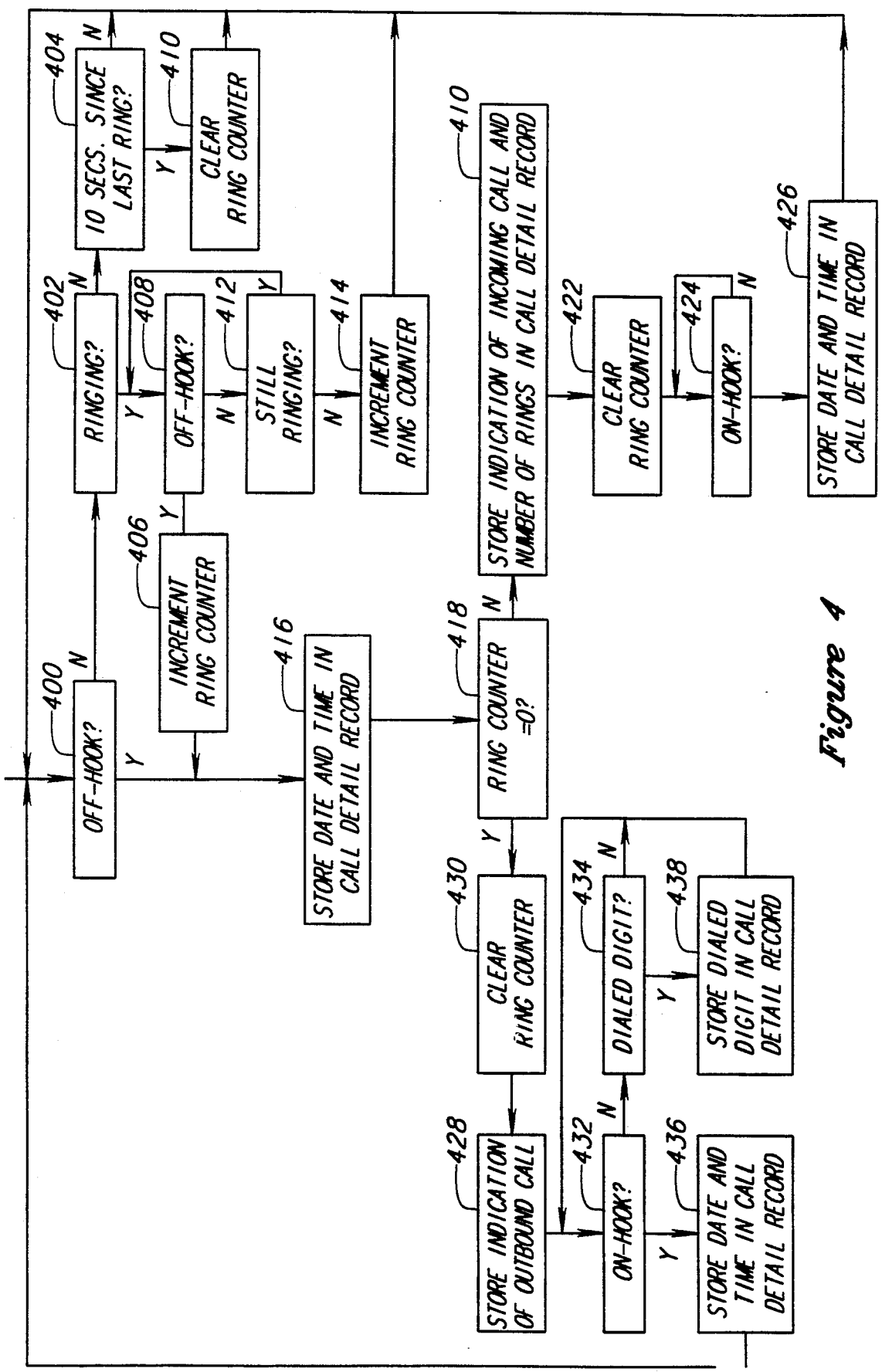
FIG. 4 is a flow chart describing the generation and storage in the memory of the call detail records.

These variables include a ring counter (shown as block 418 in FIG. 4). The ring counter is incremented each time that a ring is detected. The incrementing of the ring counter occurs in the gap between the applications of the ringing voltage. However, if the simulated telephone line 104 goes off-hook during a ringing voltage application, then the ring counter is also incremented when the off-hook condition is detected. If the simulated telephone line 104 remains on-hook for the duration of the ringing signal application, and the gaps between the rings, and the simulated telephone line 104 further remains in an on-hook condition for 10 seconds after the last application of the ringing voltage, then the ring counter is cleared as no telephone devices were taken off-hook in response to the application of the ringing voltage. The clearing of the ring counter prevents a falsely high count of the number of detected rings when the simulated telephone line 104 enters a ringing state the next time.

The ring counter may be used by the program 170 to determine if a call is incoming or outbound. If the ring counter is not zero when the simulated telephone line 104 goes off-hook, then the call is determined to be an incoming call and the number of rings in the ring counter variable may be stored in the memory 178 of the microprocessor 118 as a part of the call detail record to show the number of rings which occurred before a telephone call was answered. When the simulated telephone line 104 goes off-hook, and after the microprocessor program 170 has determined if the call is incoming or outbound, then the ring counter is cleared to prepare it for the next application of the ringing voltage by the next incoming call.

FIG. 4 presents a flow chart diagram of the steps taken to generate call detail records for both incoming and outbound calls. The generation of a call record for an incoming telephone call consists of detecting the ringing of the simulated telephone line 104 (blocks 402–414), detecting the change of state from an on-hook to an off-hook condition (blocks 400 and 408), recording the date and time of the transition from the on-hook to off-hook condition (block 416), detecting a transition back to the on-hook state from the off-hook state (block 424), and the storing in the microprocessor memory 178 information reflecting the date and time of the transition from the on-hook state to the off-hook state (block 416) along with the duration of time for which the telephone device remained off-hook or the date and time at which the transition is made back to the on-hook condition from an off-hook condition (block 426), along with an indication that a telephone call was incoming (block 420). These steps are performed by the microprocessor 118 through the use of the analog-to-digital converter 122 to detect the on-hook and off-hook states and the ringing signal, and through the use of the real-time clock 206 to accurately determine the date and time of the start and end of the telephone call, as described above. The call record information is stored in the memory 178 of the microprocessor 118 for retrieval at a later time.

When the microprocessor 118 detects a transition from the on-hook to off-hook condition (blocks 400 and 408) the date and time of the transition are stored in the microprocessor memory 178. The ring counter variable is read (block 418), and, if not zero, the number of rings is stored as a part of the call record (block 420), along with an indication in the call record which shows that the call is an incoming call (block 420). The microprocessor 118 then monitors the simulated telephone line 104 and waits for the transition from the off-hook condition back to the on-hook condition (block 424). When this occurs, the microprocessor 118 reads the real-time clock 206 and stores the time at which this transition occurred (block 426). The call detail record now has been recorded in the memory 178 of the microprocessor 118, and contains the date and time of the initiation of the call, an indication that a call was incoming and how many rings occurred before the call was answered, and the date and time of the end of the call. This information provides the usage information for the cellular transceiver 100 when an incoming call is received.

The generation of a call record for an outbound telephone call consists of the detection of the transition from an on-hook to an off-hook condition (block 400), recording the date and time of the transition from the on-hook to the off-hook state (block 416), recording the dialed digits used to place the telephone call (block 438), monitoring the voltage on the simulated telephone line 104 and detecting the transition from an off-hook state to an on-hook state (block 432), recording the date and time of the transition back to the on-hook state from the off-hook state (block 436), and the storage in the microprocessor memory 178 information reflecting the date and time of the transition from the on-hook state to the off-hook state (block 416) along with the duration of time for which the telephone remained off-hook or the date and time at which the transition from the off-hook state to the on-hook state is made (block 436), and further storing in the microprocessor memory 178 information relating to the dialed digits used to place the telephone call (block 438). As shown above, each of these steps can be accomplished through the use of the analog-to-digital converter 122 and the DTMF decoder IC 192 when coupled with the microprocessor 118 and its memory 178. As in the generation of the call record for the incoming call, the outbound call record generation uses the analog-to-digital converter 122 to detect the transitions to the on-hook and off-hook states. However, the ring counter variable will indicate that the call is outbound by the ring counter variable having a value of zero (block 418).

The microprocessor 118 monitors the simulated telephone line 104 for the transition from the off-hook state to the on-hook state (block 432), while also monitoring the DAV signal line 200 from the DTMF decoder IC 192 (block 434) and collecting and storing in its memory any digits which are dialed (block 438). When the microprocessor 118 detects the transition back to the on-hook state (block 432), the date and time of the transition is read from the real-time clock 206 and is stored in the call detail..record -(block 436). This provides a call detail record which contains the date and time of the initiation of an outbound call, any dialed digits used to place the telephone call, and the date and time of the termination of the outbound telephone call. This provides the usage information for when the cellular transceiver 100 is used for an outbound call.

Figure 9A:
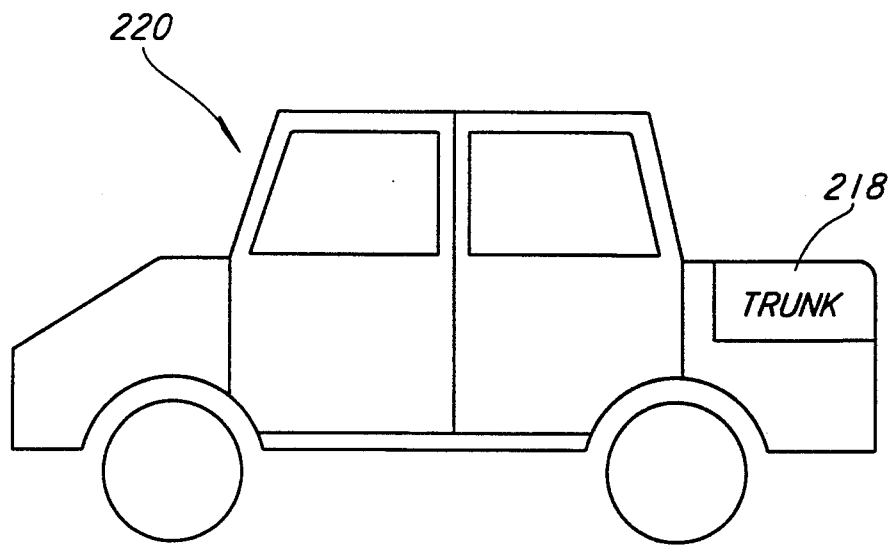
FIGS. 9A and 9B show the invention being used in a vehicle with a cellular transceiver.
Figure 9B:
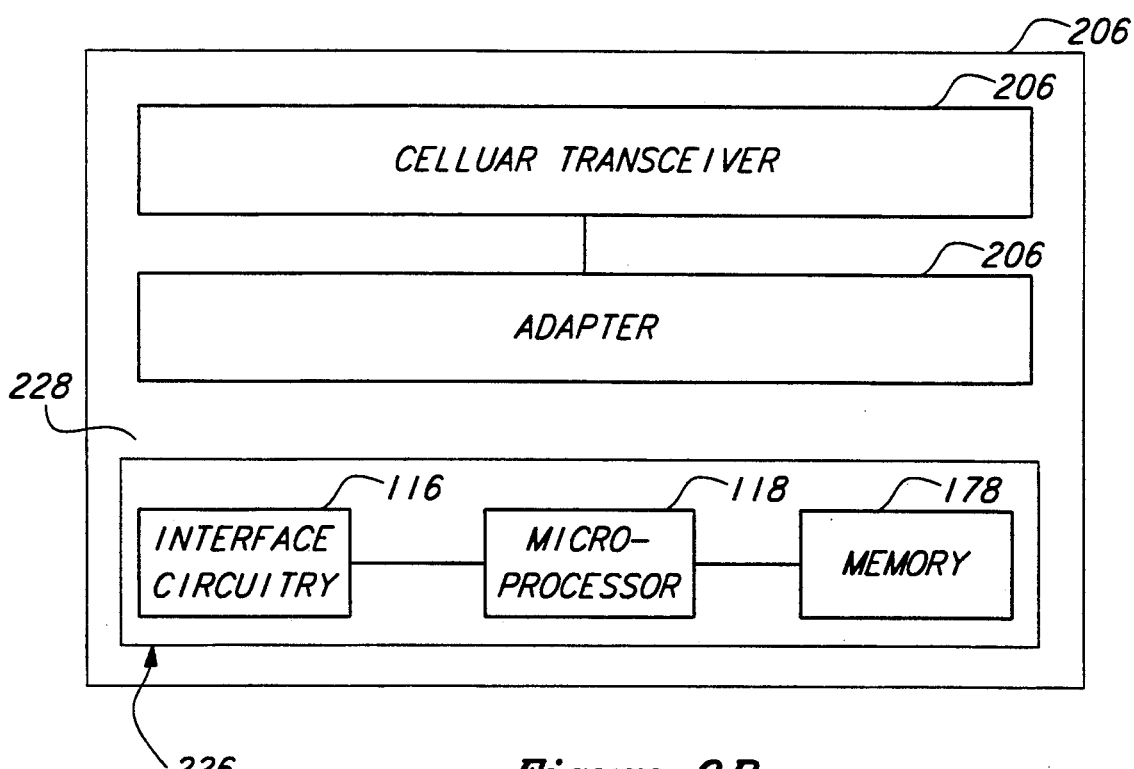

As illustrated in FIG. 9A and FIG. 9B, the invention is constructed so as to be placed in the trunk 218 of a vehicle 220 which contains the cellular transceiver 100 and the adaptor 102 which is used to convert the cellular transceiver signals into the simulated telephone line 104. The call detail record information stored in the memory 178 of the microprocessor 118 must be retrievable from the memory 178 when needed so that an evaluation of the call detail record information can be performed so as to provide a detailed listing of cellular telephone activity, perform calculations or analysis based upon the content of the call detail record information, or otherwise use the call detail record information.

Figure 5:
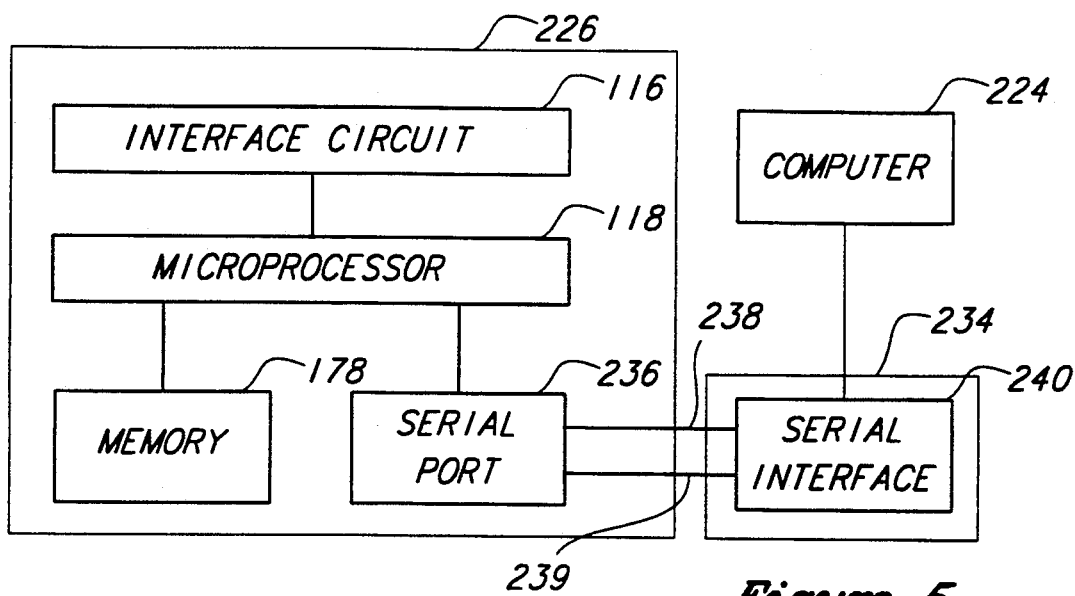
FIG. 5 shows the memory, the microprocessor, the interface circuitry and a communications means connected to the computer.
Figure 6:
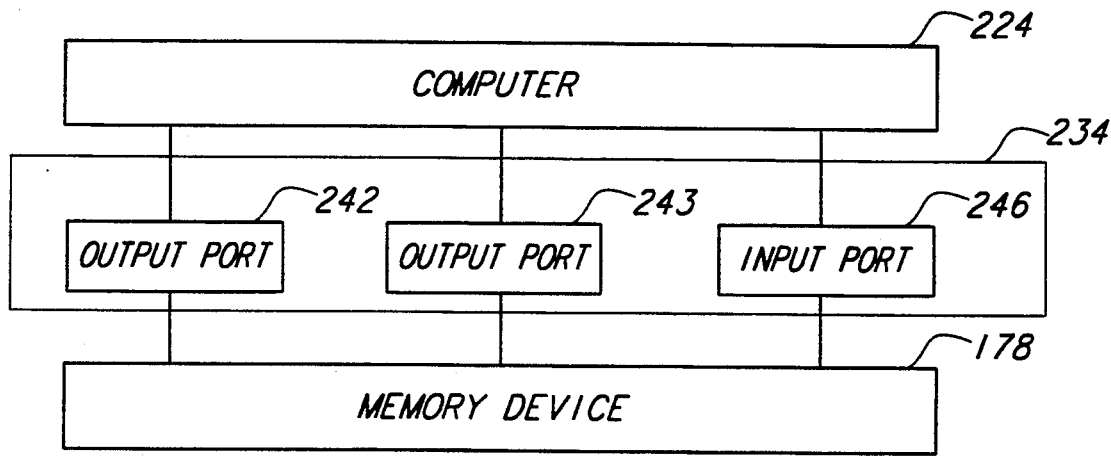
FIG. 6 shows a first alternative embodiment with the computer having output ports and an input port for reading call detail records from a memory.

To retrieve the call detail record information from the microprocessor memory 178, the microprocessor memory 178 is removed from the vehicle 220 and taken to a computer 224 (see FIG. 6). The DS2250T module 202, along with the interface circuitry 116, comprises a call record generation and collection module 226 which is removed from the vehicle 220 for collection and evaluation of the call detail record information. The backup battery 208 inside the microcontroller module 202 preserves the call detail record information in the memory 178 of the microprocessor 118. The connecting cable 228 between the simulated telephone line 104 and the module 226 containing the interface circuitry 116, the microprocessor 118 and the memory 178 is disconnected, and the module 226 can then be removed and taken to a computer 224 (see FIG. 5) so that the call detail record information stored in the memory 178 of the microprocessor 118 can be transferred to the computer 224 and evaluated. The invention could also be constructed so that the microprocessor memory 178 used to store the call detail record information was provided in a removable memory module which contained only the memory 178. When the invention is constructed in this fashion, the memory 178, which could be a module containing EEROM, a magnetic disk 232 (as in FIG. 7), or a circuit using static RAM and a backup battery, would be removed while leaving the microprocessor 118 and the interface circuitry 116 connected to the simulated telephone line 104. Through the use of a removable memory module, the call detail record information which relates to the usage of the cellular transceiver 100 can be easily transferred to a computer 224 for evaluation.

The computer 224 used to collect the call detail record information could be inside an office of a rental car agency, or the computer 244 could be a computer available to the owner of the cellular transceiver 100, or any other computer 224 through which the user of the invention wishes to retrieve the call detail record information.

As shown in FIG. 5, the microprocessor 118 is connected to a serial communications means 234 which enables the computer 224 to read the call detail record information from the memory 178. The module 226 containing the interface circuitry 116, the microprocessor 118 and the memory 178 is connected to the computer 224 through a serial interface circuitry 240. The microprocessor 118 has a serial port 236 consisting of transmit data 238 and receive data 239 signal lines which are used to communicate with the computer 224. The transmit 238 and receive 239 data signal lines are passed through serial interface circuitry 240 to provide compatibility with the RS232 standard signals available on most computers 224. The serial interface circuitry 240 consists of a MAX232 IC available from Maxim Integrated Products, and is used in a fashion well practised in the art.

Figure 7:
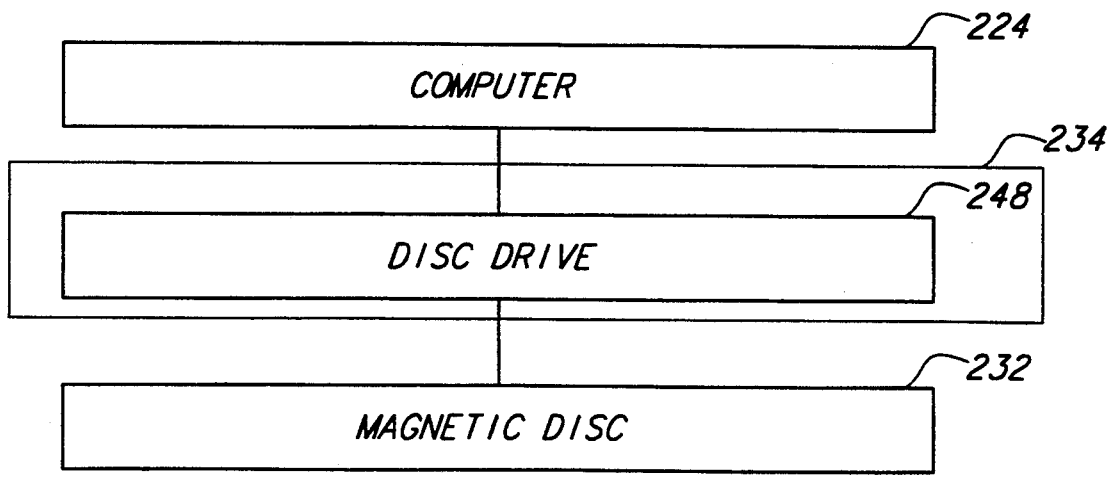
FIG. 7 shows a second alternative embodiment with the computer having a disk drive for reading call detail records from a removable magnetic disk, where the call detail records were recorded on the magnetic disk by the call record generation and collection device and the removable magnetic disk was removed from the call detail record generation and collection device and placed into the disk drive.

When the memory 178 used to store the call detail record information consists of a removable module containing EEROM or static RAM, other communications means 234 could be used between the memory 178 and the computer 224, such as providing output ports 242 and 243 from the computer 224 for the memory address 244 and control 245 signals, and an input port 246 for reading the data 247 from the memory 178, as shown in FIG. 6. When the memory 178 consists of a magnetic disk 232, the computer 224 would use a disk drive 248 to provide the communications means 234 between the removable memory and the computer 224, as shown in FIG. 7.

Referring again to FIG. 5, a serial communications protocol is used to read the call detail record information from the microprocessor memory 178. The microprocessor 118, under control of its program 170, interprets commands and transfers data to the computer 224 through the serial communications means 234. The serial communications protocol consists of a number of commands which are used to cause the microprocessor 118 to release to the computer 224 the call detail record information, and other information stored in the memory 178 of the microprocessor 118. Each command is prefaced with a synchronizing byte. This synchronizing byte is the letter U in upper case, with a hexadecimal value of 55H. Each command is a single upper-case letter, and must be received within one second of the reception of the synchronizing byte in order for a command to be valid. The use of the synchronizing byte ensures that any noise received on the serial communications lines 238 and 239 will not be interpreted by the microprocessor 118 as a command, since it would be very unlikely that noise on the serial communications lines 238 and 239 would be interpreted as the synchronizing byte, along with a command byte within the one second time frame.

Figure 2:
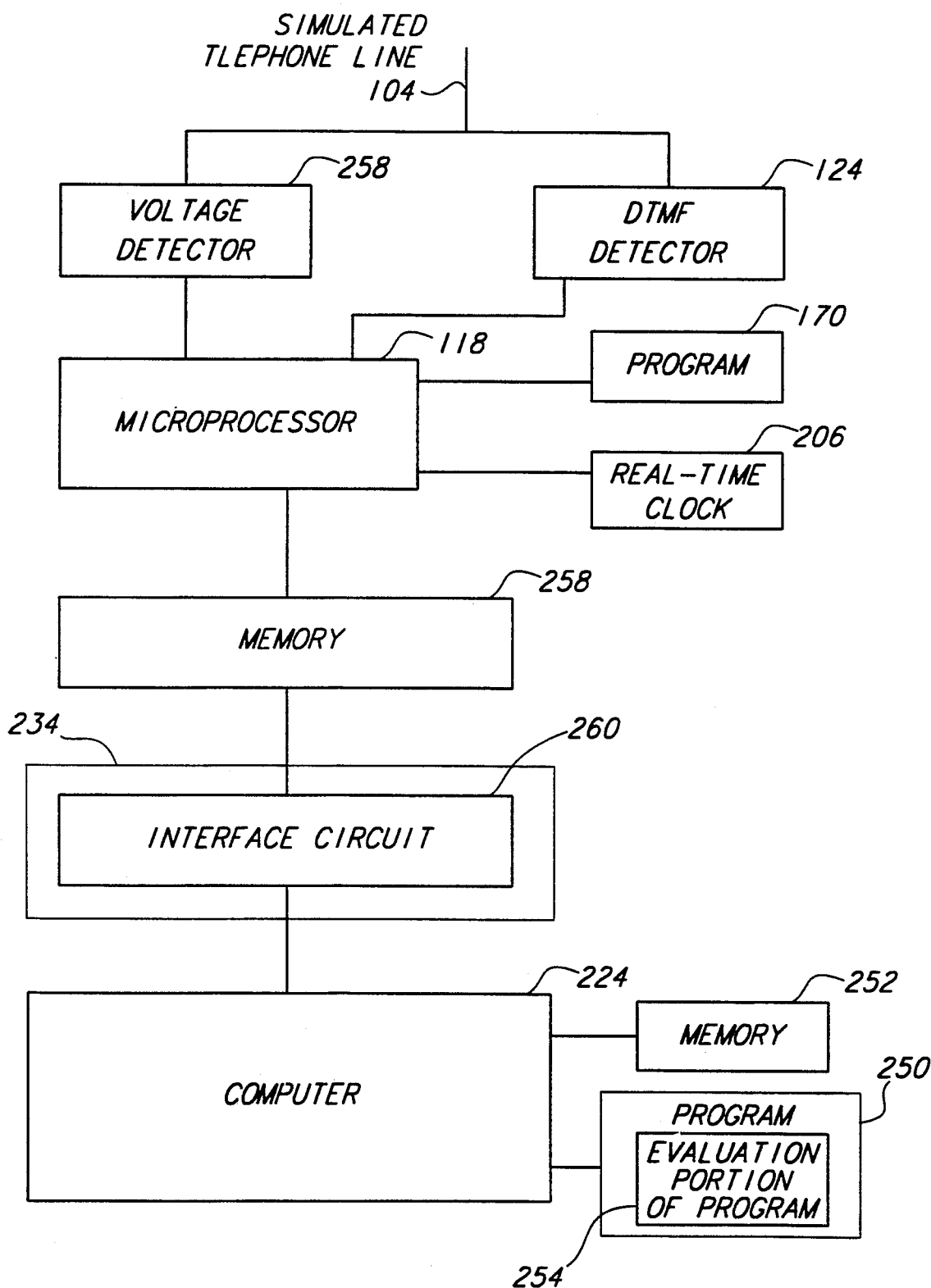
FIG. 2 shows the invention with a memory which can be connected to a computer.

The command N causes the microprocessor 118 to return to the computer 224, through the serial communications means 234, a set of variables which can be used by the program 250 (see FIG. 2) running in the computer 22 to determine the total amount of the microprocessor memory 178 which is filled with call detail record information, along with any other variables which must be returned to the computer 224 from the microprocessor order to ensure a successful data transfer operation. For example, the N command can return a count of the number of bytes in the memory 178 which contain call detail record information. The computer 224 could then determine the amount of data which was to be transferred.

The R command causes the microprocessor 118 to send the call detail record information to the computer 224. The microprocessor 118 starts at the beginning of the call detail record information in memory 178 and sends the call detail record information to the computer 224 one byte at a time over the serial communications means 234. Once all the call detail record information has been sent to the computer 224, the microprocessor 118 sends a checksum byte. This byte is the sum, modulo 256, of all of the data bytes of call detail record information which were sent to the computer 224. The program 250 in the computer 224 can perform a similar checksum operation on the received call detail record information and determine if there was an error in the transmission of the call detail record information from the microprocessor 118 to the computer 224. The R command does not clear the memory 178 of the call detail record information. If an error was detected in the transfer of the call detail record information, as detected by the calculated checksum not exactly matching the transmitted checksum, then the R command could be used again to attempt another transfer. This can be continued until a successful transfer is achieved.

The Z command causes the microprocessor 118 to reset the internal variables which keep track of the call detail record information in the microprocessor memory 178, effectively erasing the call detail record information which has been stored in the memory 178 of the microprocessor 118. Attempts to read the call detail record information from the microprocessor memory 178 after the Z command has been used will result in no transfer of data, unless the microprocessor 118 has recorded new call detail record information from usage of the cellular transceiver 100.

The C command is used with a string of characters which follow the C command. This string of characters is interpreted by the microprocessor 118 as a new date and time setting for the real-time clock 206. The C command is used to set the real-time clock 206 so that the date and time recorded as a part of the call detail record information is accurate. The microprocessor 118 reads and interprets the string of characters following the C command and sets the real-time clock 206 based upon the interpreted values of the string used to set the real-time clock 206.

The D command is used to read the date and time from the real-time clock 206 and return the date and time information to the computer 224. This command is used to verify that the real-time clock 206 has the correct date and time. The microprocessor 118 reads the real-time clock 206 and converts the clock output into ASCII text which is sent to the computer 22 through the serial communications means 234.

The S command is used to store 14 bytes of information in the memory 178 of the microprocessor 118. The I command returns the 14 bytes of information to the computer 224. The 14 bytes stored in the memory 178 of the microprocessor 118 may contain an identification number or other information. When used with a cellular transceiver 100 which is rented to a customer, this 14 byte information space may also contain a customer number and the date and time of the rental.

The computer 224 can read and set the real-time clock 206 so that the clock can be kept accurate using the commands as described above with the C and D commands. This allows the computer 224 to change the date and time of the real-time clock to account for inaccuracies in the clock, time zone changes, transitions to or from daylight savings time, and other situations which would require the clock date and time to need to be set.

In addition to transferring the call detail record information, other information can be stored and retrieved from the memory 178 of the microprocessor 118 using the S and I commands described above. This information may include an identification number for the device, or information on when a car containing a cellular transceiver 100 was rented and to whom.

The call detail record information received by the computer 224 can be placed in its memory 252 (see FIG. 2) and/or a disk file (not shown). The computer 224 can now analyze the call record detail information and generate a bill for the use of the cellular transceiver 100, provide a detailed listing of the usage of the cellular transceiver 100, and analyze the call detail record information for any other desired purpose.

An evaluation portion 254 (see FIG. 2) of the program 250 of the computer 224 can contain very complex evaluation based on the type of call, time of day or week of the call, and the duration of the call. When the invention is used with an evaluation program 254 in the computer 224 which creates a billing for usage of the cellular transceiver 100, the billing can include different charges for different types of call including different charges for local or long distance calls, different rates per minute for different types of long distance calls based on the area code of an outbound call so as to accurately reflect the actual costs of such calls, the inclusion of special variables so as to allow no-charge usage of the cellular transceiver 100 to call emergency or information numbers, variables to allow a call to a specific telephone number or area code with no charge, variables to provide special billing functions so as to allow no-charge usage of the cellular telephone to call specific numbers or for specific amounts of time, and many other alterations and additions to the billing evaluation and computation which will become apparent to one skilled in the art. The program 250 in the computer 224 which provides the evaluation and billing of such calls is independent of the microprocessor program 170, so changes to the billing evaluation program 254 can be made without any modification to the microprocessor program 170 in the call record generation and collection module 226.

The evaluation of the call detail record information by the computer 224 using an evaluation program 254 which is independent of the program 170 in the call record generation and storage module 226 allows the tailoring of reports to be generated to the needs of a user of the invention, without requiring modifications to the microprocessor program 170 or other modifications to the invention. The use of a memory in the mobile unit and a communications means to transfer the call detail record information to the stationary unit with the computer and its program provides this flexibility by providing a means to transfer the call detail record information from the call record generation and collection module 226 to the computer 224, so that the evaluation program 254 which evaluates the call detail record information can operate independently of the microprocessor program 170 used to generate and collect the call detail record information.

The evaluation program 254 of the computer program 250 can break up into fields the dialed phone number used to place an outbound telephone call. The length and content of these fields can be evaluated to determine if a call was a local call or a long distance call. Additionally, when a long distance call is made the evaluation program 254 can examine the area code section of the dialed phone number and make different evaluations based upon the area code dialed for the outbound call. The long-distance area code could be used to determine the rate at which to bill the call. Calls with area codes of 800 and 900 could be specially handled.

Figure 10:
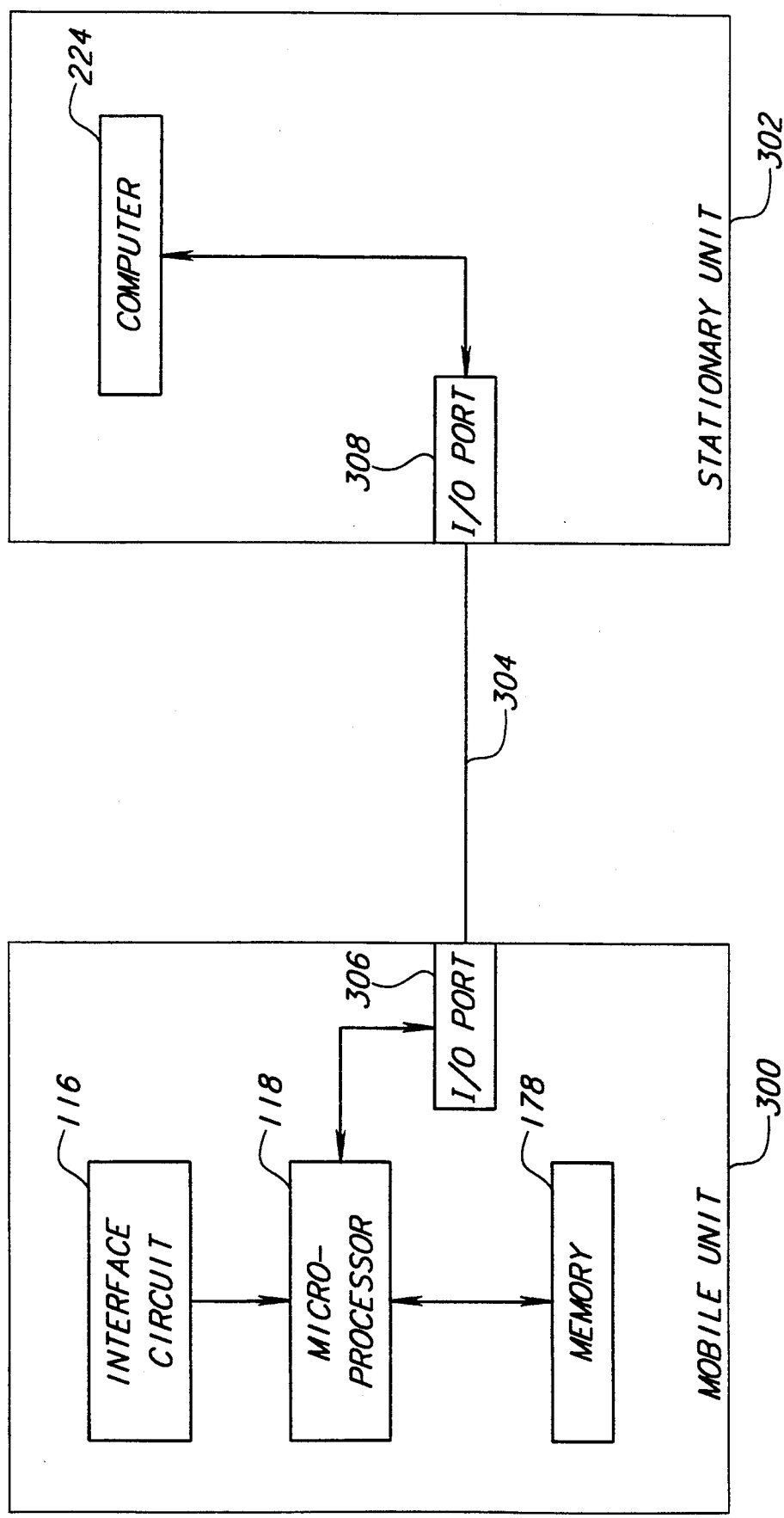
FIG. 10 shows a third alternative embodiment in which a cable is used to transfer the call detail information from the mobile unit to the stationary unit.

As shown in FIG. 10, an alternative embodiment of the invention includes a cable 304 which is used to transfer the call detail record information from the mobile unit 300 containing the memory 178 to the stationary unit 302 containing the computer 224. In this alternative embodiment, and the alternative embodiments shown in FIGS. 11 and 12, the memory 178 does not need to be contained in a removable module. The microprocessor 118 transfers data to the computer 224 via cable 304 using a serial protocol as described above. I/O port 306 couples the microprocessor to cable 304, and I/O port 308 couples the computer to cable 304.

Figure 11:
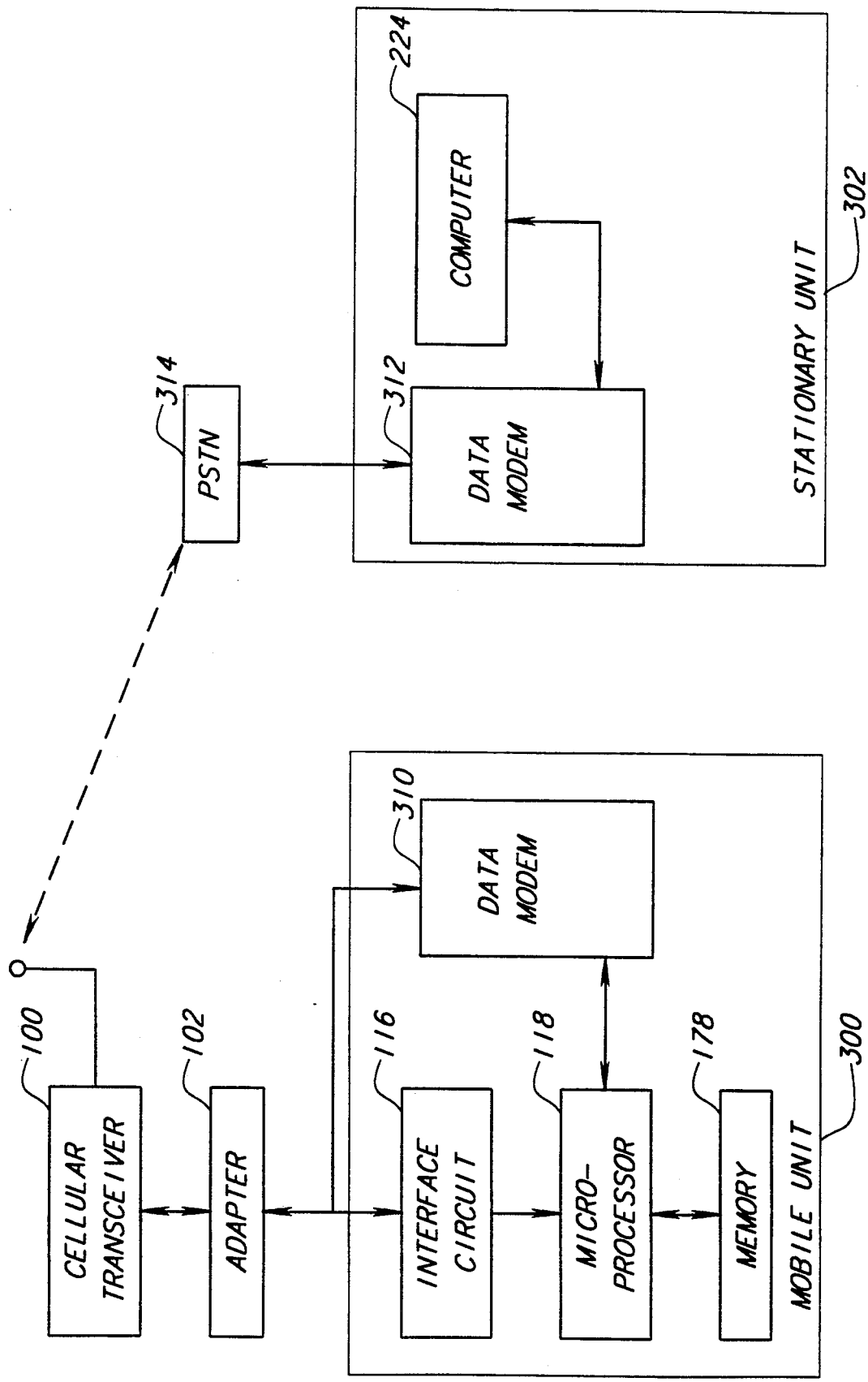
FIG. 11 shows a fourth alternative embodiment in which a modem is used with the cellular transceiver to transfer the call detail information from the mobile unit to the stationary unit.

FIG. 11 shows another alternative embodiment of the invention in which the microprocessor 118 is coupled to a modem 310 which is coupled to the adapter 102 and thereby coupled to the cellular transceiver 100. Computer 224 in stationary unit 302 is also coupled to modem 312, which connects to the public switched telephone network 314. The microprocessor 118 transfers data from the memory 178 to computer 224 through modems 310 and 312. Cellular transceiver 100 is coupled to public switched telephone network 314 via the cellular network (not shown) in the conventional manner. The transfer of the call detail record information from the memory 178 to the computer 224 may be accomplished with a serial protocol as described above, or may be accomplished with an alternative protocol more suitable for modem data transfers. Such alternative-protocols may include Xmodem, Ymodem, Zmodem or other such protocols widely known and used in the field of data modem transfers. The call detail record information may be collected from the mobile unit 300 by computer 224 in the stationary unit at any desired time. The computer 224 may place a telephone call to the mobile unit 300 via modems 312 and 310, public switched telephone network 314, the cellular network (not shown), cellular transceiver 100, and adaptor 102. The call detail record information may be retrieved from memory 178 and transferred by microprocessor 118 to computer 224 via modems 310 and 312. Alternatively, microprocessor 118 may initiate a telephone call via modem 310, adaptor 102, the cellular network, and cellular transceiver 100. This telephone call may be answered by modem 312 via public switched telephone network 314. Microprocessor 118 may then transfer the call detail record information to computer 224 via modems 310 and 312.

Figure 12:
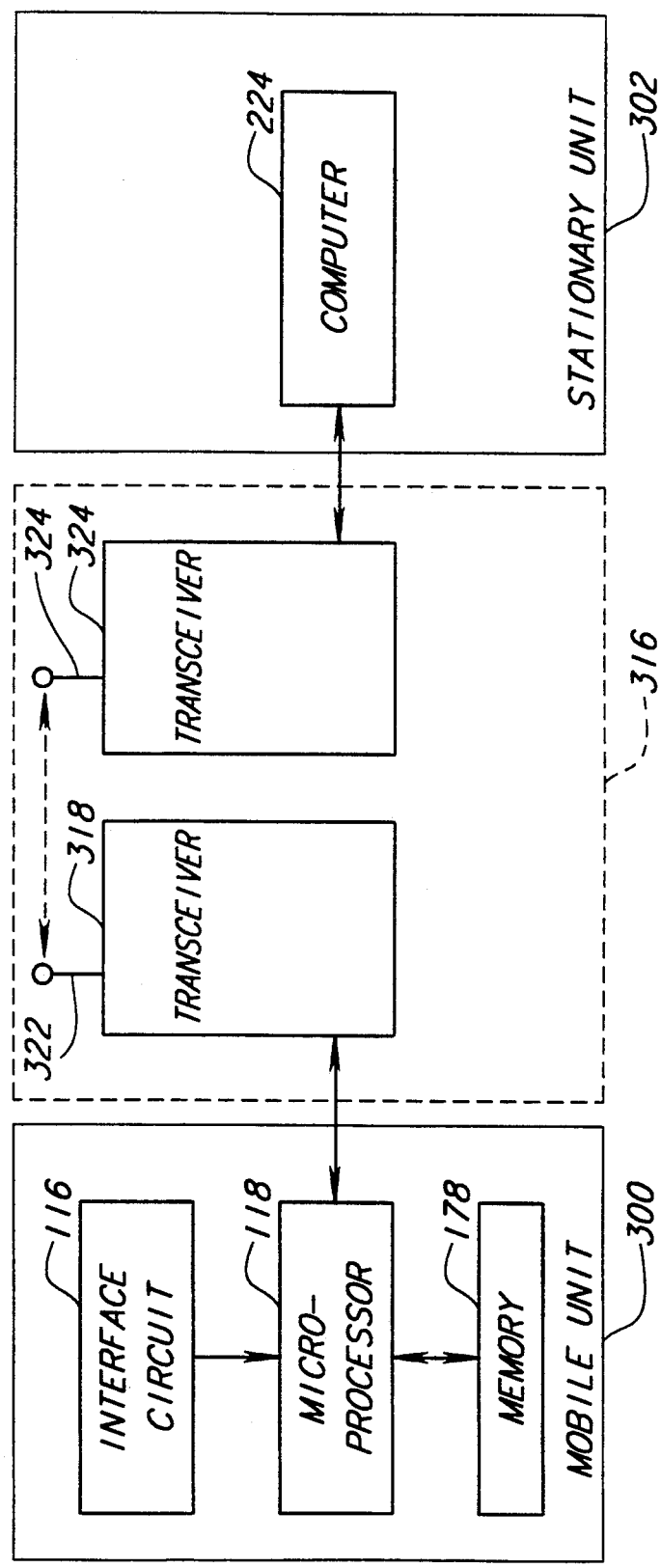
FIG. 12 shows a fifth alternative embodiment in which a radio link is used to transfer the call detail information from the mobile unit to the stationary unit.

Referring to FIG. 12, another alternative embodiment of the invention is shown. In this alternative embodiment the call detail record information is transferred from memory 178 by the microprocessor 118 through radio link 316. Radio link 316 comprises transceivers 318 and 320, data modems (not shown) for modulating and demodulating signals for use with transceivers 318 and 320, and antennas 322 and 324. Transceivers 318 and 320 are in radio communication With each other via antennas 322 and 324 in a conventional manner. Radio link 316 provides a communications interface between the microprocessor 118 and the computer 224 for transfer of the call detail record information from the memory 178 to computer 224. The radio link 316 may be used to allow wireless transfer of the call record detail information. When the invention is used in a rental vehicle equipped with a cellular transceiver 100, it can be highly desirable to transfer the call record detail information from memory 178 to the computer 224 for evaluation without requiring any human intervention. Radio link 316 provides an interface for the transfer of the call detail record information in an automatic fashion under the control of microprocessor 118. The call detail record information may be transferred to computer 224 in a serial fashion as described above, in an alternative protocol as described above, or in an alternative protocol suitable for the transfer of data over radio link 316.

The invention has been described in several embodiments, each of which include a mobile unit for connection to the cellular transceiver for generation and collection of call detail record information, a stationary unit which includes a computer for evaluation of the call detail record information, and a communications interface which transfers the call detail record information from the mobile unit to the stationary unit. The invention provides a practical system for monitoring the usage of a cellular telephone such that evaluation of the usage of the cellular telephone can be easily performed. The invention also provides the monitoring of the usage of the cellular telephone in a fashion which allows the evaluation of the cellular telephone usage information to be tailored to the needs of the user of the invention.

Although the detailed description of the invention has been made in respect to specific embodiments of the invention, alterations and modifications to the invention will become apparent to one of ordinary skill in the art. The claims are intended to apply to any such alterations and modifications which fall under the spirit and scope of the following claims.

I claim:

1. A usage monitoring system for a cellular transceiver having an adaptor which provides a simulated telephone line for connection to a conventional telephone device, comprising:
   a mobile unit having:
      a voltage detector which detects the voltage on the simulated telephone line and generates a voltage level signal;
      a dual-tone multi-frequency (DTMF) detector which detects dialed DTMF digits on the simulated telephone line and generates a dialed digit signal for each dialed DTMF digit;
      a real-time clock generating a clock signal;
      a memory;
      a microprocessor having a program and being coupled to the simulated telephone line, said microprocessor also being coupled to said clock and said memory, said microprocessor receiving said voltage level signal from said voltage detector and detecting changes in the voltage on the simulated telephone line to determine on-hook, off-hook and ringing conditions of the simulated telephone line, said microprocessor further receiving said dialed digit signals from said DTMF detector and storing dialed DTMF digits in said memory, said microprocessor reading said real-time clock at transitions between said on-hook and off--hook conditions and storing information based on said clock signal indicative of usage of the telephone device in said memory; and
   a stationary unit having:
      a computer with a memory and an evaluation program, said evaluation program being operative to evaluate said information indicative of usage of the telephone device and said dialed DTMF digits; and
      a communications interface which transfers said information indicative of usage of the telephone device and said dialed DTMF digits from said memory in said mobile unit to said stationary unit for evaluation by said computer and said evaluation program.

2. The system of claim 1 wherein said memory is contained in a removable memory module, removable from said mobile unit, and said communications interface connects to said removable memory module and said stationary unit.

3. The system of claim 2 wherein said memory is contained in a module which also contains said microprocessor.

4. The system of claim 1 wherein said memory is a static RAM with a backup battery.

5. The system of claim 1 wherein said memory is an EEROM.

6. The system of claim 1 wherein said memory is a magnetic disk.

7. The system of claim wherein said voltage detector is a voltage divider and an analog-to-digital converter.

8. The system of claim wherein said communications interface is a serial communications link.

9. The system of claim 1 wherein said communications interface is a cable.

10. The system of claim 1 wherein said communications interface is a data modem coupled to the cellular transceiver.

11. The system of claim wherein said communications interface is a radio link.

12. A usage monitoring system for a cellular transceiver having an adaptor which provides a simulated telephone line for connection to a conventional telephone device, comprising:
   a mobile unit having:
      means for detecting the voltage on the simulated telephone line;
      means for detecting dialed dual-tone multi-frequency (DTMF) digits on the simulated telephone line;
      a real-time clock;
      a memory;
      a microprocessor having a program and being coupled to said voltage detecting means, said dialed DTMF digit detecting means, said real-time clock, and said memory, said microprocessor being operative to detect changes in the voltage level on the simulated telephone line by said voltage detection means and thereby determine on-hook, off-hook and ringing conditions of the simulated telephone line, said microprocessor being further operative to detect dialed DTMF digits by said dialed DTMF digit detection means and store said dialed DTMF digits in said memory, and being further operative to read said real-time clock at transitions between said on-hook and off-hook conditions and store information indicative of usage of the telephone device in said memory; and
   a stationary unit having:
      a computer with a memory and an evaluation means for evaluating said information indicative of usage of the telephone device and said dialed DTMF digits; and
      communications means for transferring said information indicative of usage of the telephone device and said dialed DTMF digits from said memory in said mobile unit to said stationary unit for evaluation by said computer and said evaluation means.

13. The system of claim 12 wherein said memory is contained in a removable memory module, removable from said mobile unit, and said communications means connects to said removable memory module and said stationary unit.

14. The system of claim 13 wherein said memory is contained in a module which also contains said microprocessor.

15. The system of claim 12 wherein said memory is static RAM with a backup battery.

16. The system of claim 12 wherein said memory is an EEROM.

17. The system of claim 12 wherein said memory is a magnetic disk.

18. The system of claim 12 wherein said voltage detection means is a voltage divider and an analog-to-digital converter.

19. The system of claim 12 wherein said communications means is a serial communications link.

20. The system of claim 12 wherein said communications means is a cable.

21. The system of claim 12 wherein said communications means is a data modem coupled to the cellular transceiver.

22. The system of claim 12 wherein said communications means is a radio link.

23. The system of claim 12 wherein said evaluation means evaluates said information indicative of usage of the telephone device and said dialed DTMF digits based upon a determination that a call is a local call or a long-distance call.

24. The system of claim 12 wherein said evaluation means evaluates said information indicative of usage of the telephone device and said dialed DTMF digits based upon the destination area code of an outbound call.

25. A method of providing evaluation of the usage of a cellular transceiver having an adaptor which provides a simulated telephone line for connection to a conventional telephone device, said method comprising:
   providing a mobile unit having a voltage detector, a dual-tone multi-frequency (DTMF) detector, a real-time clock, a memory, and a microprocessor;
   detecting the voltage on the simulated telephone line so as to determine on-hook, off-hook and ringing conditions;
   recording the time at which a transition from an on-hook to an off-hook condition is made in said memory, and further recording the time at which a transition from an off-hook to an on-hook condition is made in said memory;
   determining if a transition from an on-hook to an off-hook condition was preceded by a ringing condition, and recording an indication based thereon that a particular telephone call is incoming or outbound in said memory;
   detecting any dialed dual-tone multi-frequency (DTMF) digits from the simulated telephone line during an outbound call;
   recording any dialed DTMF digits during an outbound call in said memory ;
   providing a stationary unit having a computer with a memory, and an evaluation program;
   providing a communications interface to transfer information between said mobile unit and said stationary unit;
   transferring said times of transitions from an on-hook to an off-hook state or from an off-hook to an on-hook state, said indication that a particular telephone call is incoming or outbound, and said dialed DTMF digits from said memory in said mobile unit into said memory of said computer so as to create call detail record information in said memory of said computer, said call detail record information relating to the usage of the telephone device; and
   evaluating said call detail record information in said memory of said computer.

26. The method of claim 25 wherein said evaluation program evaluates said call detail record information based upon a determination that a call is a local call or a long-distance call.

27. The method of claim 25, wherein said evaluation program evaluates said call detail record information based upon the destination area code of an outbound call.

* * * * *

UNITED STATES PATENT AND TRADEMARK OFFICE
CERTIFICATE OF CORRECTION

PATENT NO. : 5,233,642
DATED : August 3, 1993
INVENTOR(S) : Paul Renton

It is certified that error appears in the above-identified patent and that said Letters Patent is hereby corrected as shown below:

In column 18, claim 11, line 22, between "claim" and "wherein", please insert --1--.

Signed and Sealed this

Twenty-second Day of March, 1994

Attest:

BRUCE LEHMAN

Attesting Officer     Commissioner of Patents and Trademarks